Oct. 27, 1953  C. W. WALZ ET AL  2,656,661
BEET HARVESTER
Original Filed Nov. 9, 1945  5 Sheets-Sheet 1

INVENTORS
CLAUDE W. WALZ
HOWARD F. CLAUSEN
BY
ATTORNEYS.

Oct. 27, 1953 C. W. WALZ ET AL 2,656,661
BEET HARVESTER
Original Filed Nov. 9, 1945 5 Sheets-Sheet 2

INVENTORS
CLAUDE W. WALZ
HOWARD F. CLAUSEN
BY
ATTORNEYS.

Oct. 27, 1953 C. W. WALZ ET AL 2,656,661
BEET HARVESTER
Original Filed Nov. 9, 1945 5 Sheets-Sheet 4

INVENTORS
CLAUDE W. WALZ
HOWARD F. CLAUSEN
BY
ATTORNEYS.

Oct. 27, 1953 C. W. WALZ ET AL 2,656,661
BEET HARVESTER

Original Filed Nov. 9, 1945 5 Sheets-Sheet 5

INVENTORS
CLAUDE W. WALZ
HOWARD F. CLAUSEN
BY
ATTORNEYS.

Patented Oct. 27, 1953

2,656,661

UNITED STATES PATENT OFFICE 2,656,661

BEET HARVESTER

Claude W. Walz, Rock Island, and Howard F. Clausen, Moline, Ill., assignors to Deere & Company, Moline, Ill., a corporation of Illinois Original application November 9, 1945, Serial No. 627,683. Divided and this application February 25, 1950, Serial No. 146,208

8 Claims. (Cl. 55—106)

1

This application is a division of our co-pending application, Serial No. 627,683, filed November 9, 1945, now U. S. Patent 2,528,806, issued November 7, 1950.

The present invention relates generally to harvesting machines and more particularly to harvesters for root crops and the like, especially sugar beets.

The object and general nature of this invention is the provision of a root crop harvester in which provision is made to free the crop roots from the ground without bringing up objectionable quantities of soil. More particularly, it is a feature of this invention to provide a harvester in which substantially no clods are formed when pulling the beets or other crop, especially clods of a size similar to a beet and which under certain conditions tend to pass through the machine with the beets.

Another important feature of the present invention is the provision of crop-engaging means in the form of horizontal bars or the like movable about a generally horizontal axis adjacent the upper pair of lifting members, which bars serve not only to break any clods or the like but also to impart an additional raising action to the beets or other crop engaged thereby. In one form of this invention the auxiliary lifting bars are arranged in the form of a horizontally disposed rotatable cage at each side of the central plane of the device, each rotatable member being mounted for laterally inward and outward movement and also for movement about a vertical axis, whereby the auxiliary lifters may move about in handling the beets or the crop and accommodate not only various sizes but also may engage two beets simultaneously.

These and other objects and advantages of the present invention will be apparent to those skilled in the art after a consideration of the following detailed description, taken in conjunction with the accompanying drawings in which the preferred forms of this invention have been illustrated.

Referring now to the drawings:

Figures 2 and 3 are enlarged fragmentary perspective views showing in particular the relation between the lower points or lifting members, the upper pair of lifting members and the rotatable auxiliary lifting devices or kicker wheels, Figure 2 being a view taken generally from the side of the lifting unit while Figure 3 is a view taken approximately from the front;

Figure 1:
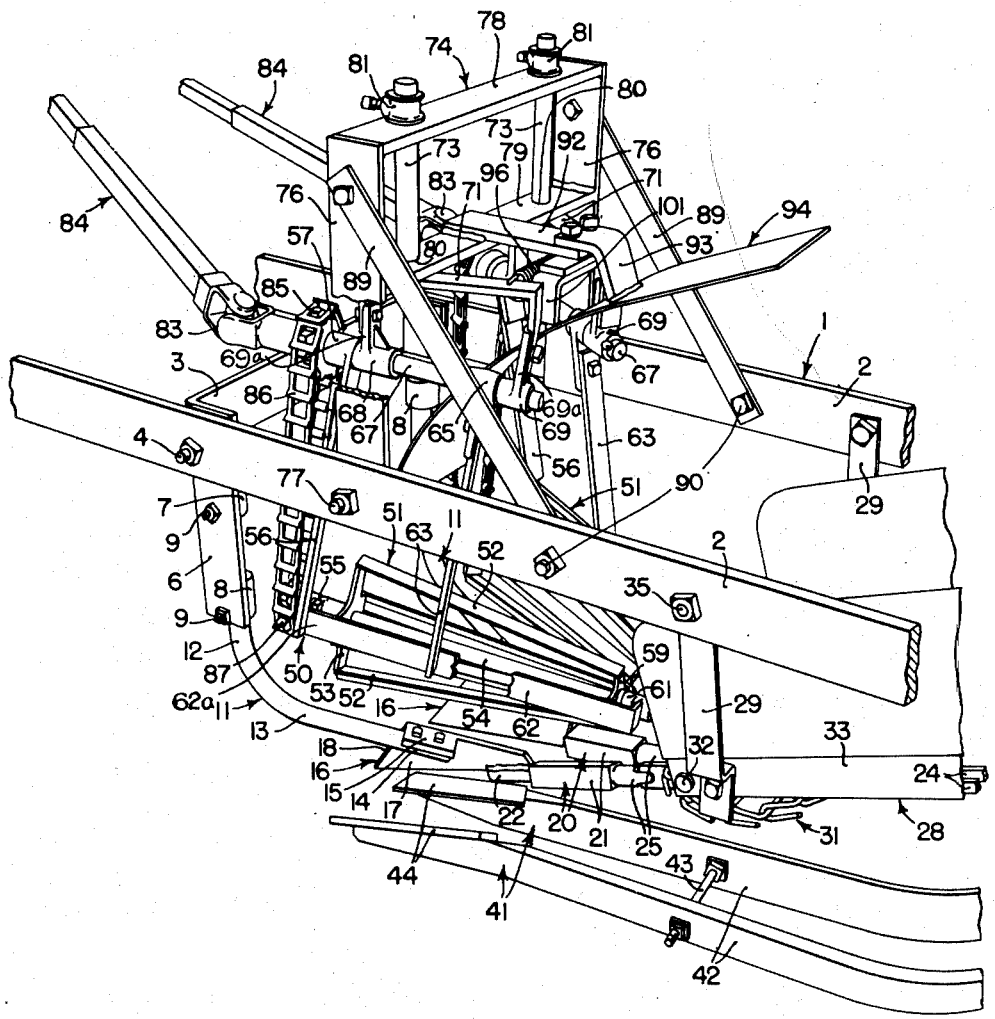
Figure 1 is a perspective view of the lifting mechanism of a beet harvester, certain parts having been omitted, in which the principles of the present invention have been incorporated, the form of the invention shown in Figure 1 incorporating a pair of laterally shiftable and oscillatable kicker wheels.
Figure 2:
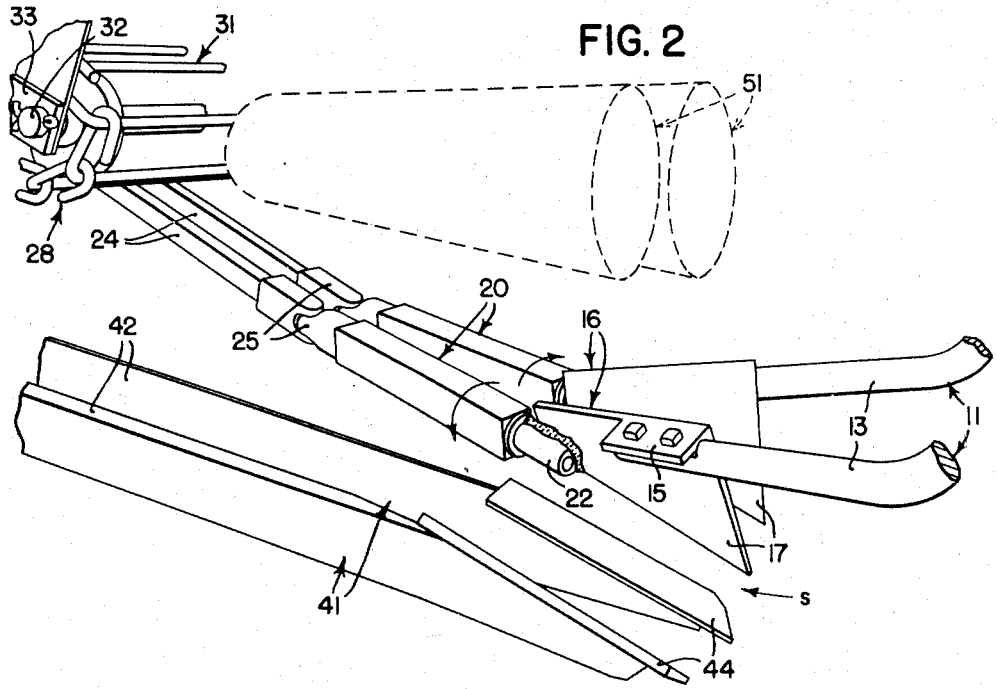
Figure 3:
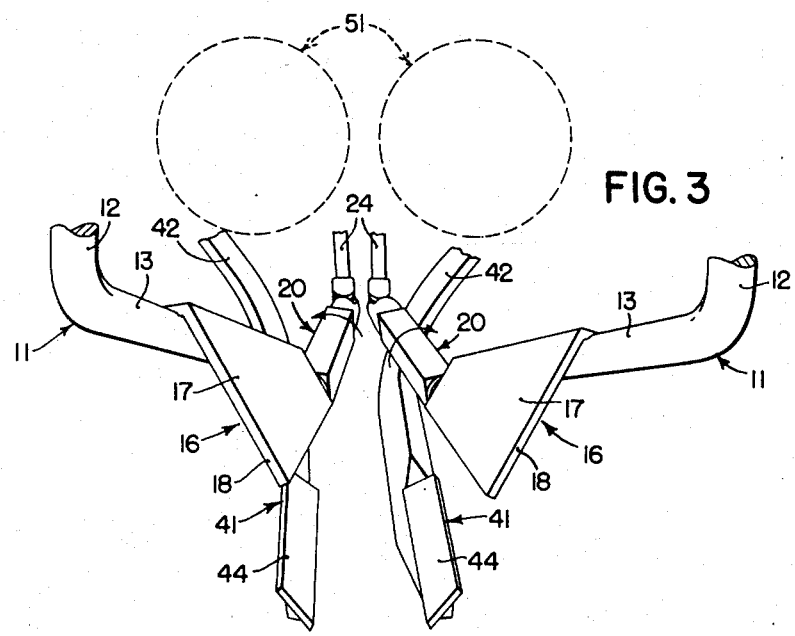

In the form of the invention shown in Figures 1-4, the frame of the harvester, which is shown as particularly designed for harvesting sugar beets, constitutes a mobile support and is indicated by the reference numeral 1. The frame or mobile support 1 comprises a plurality of generally longitudinally disposed frame bars 2 connected together by one or more cross bars 3 bolted thereto, as at 4. Each of the frame bars 2 is provided with a depending bracket 6, preferably secured to the frame 1 by the above mentioned bolts 4, and each bracket 6 is provided with a pair of sleeves 7 and 8, preferably welded thereto, each bracket 6 being tapped to receive a pair of set screws 9, one for each of the sleeves 7 and 8. Each of the brackets 6 serves as means for connecting a lifting member standard 11 to the frame 1. Each standard 11 has a vertically disposed section 12 that is disposed in position in the sleeves 7 and 8, being held therein by tightening the set screws 9. Each standard 11 also includes a rearwardly directed portion 13 which is flattened, as at 14, and apertured to receive bolts or other securing means by which a bracket section 15 of an upper puller point member 16 is connected to the standard 11. Each lifting member or puller point member 16 comprises a forward section 17 which is disposed in a generally vertical position and has a forwardly and upwardly facing edge 18. Each member 16 also includes a rear rotatable section indicated in its entirety by the reference numeral 20. The rear rotatable section 20 comprises a polygonal, preferably square, part 21 having a forward spindle portion which is rotatably mounted in a journal 22 that is fixed, as by welding, to the rear portion of the forward puller point member section 17. Each puller point member 16 is constructed as just described, and the forward fixed sections 17 are disposed in upwardly diverging planes, as best shown in Figure 3. The sections 17 are also arranged in rearwardly converging relation and are dimensioned and angled so as to exert an upward force on the beets or other crops. The rotatable portions 20 of the two upper lifting members 16 are driven by any suitable means, such as a pair of generally longitudinally extending shafts 24, each connected at its forward end by a universal joint 25 to the associated rotatable section 20. Preferably, the shafts 24 are disposed just underneath an upwardly and rearwardly extending conveyor or elevator 28 which at its forward end is supported by a pair of straps 29 from the frame bars 2. The conveyor 28 includes an endless chain 31 that is supported at its forward portion by any suitable means on a transverse shaft member 32 journaled in the front ends of bars 33 forming the frame of the conveyor unit 28. The lower end of each of the straps 29 is bolted to the forward end of the associated conveyor frame bar 33 and the upper end of each of the straps 29 is bolted, as at 35, to the associated frame bar 2.

The lower pair of puller point members or lifting members is disposed well below and slightly to the rear of the puller members 16, each being indicated by the reference numeral 41. Each lower member 41 comprises a generally longitudinally extending beam section 42 which is fastened together, by any suitable means, such as a bolt 43, and extends upwardly and rearwardly and is attached to the harvester frame 1 in any suitable manner. The forward end of each of the beam sections 42 is shaped so as to receive a puller blade section 44. Each puller blade section 44 is arranged in a forwardly diverging position and faces generally upwardly and forwardly. The space between the lower blades 44 and the upper puller members 16 is indicated in Figure 2 by reference character s, it being noted also from this figure that, as to the upper puller members 16, the sections 20 form rear rotatable sections while the forward sections are relatively rigid.

The points are so arranged that, in operation, the lower members 41 act upon the lower portions of the beets or other crop while the upper puller members 16 operate quite close to the surface of the ground and act upon the upper portions of the beet, both sets of points being arranged so as to act substantially at about the same time on the same beet or other crop. While the relatively deeper penetrating point members 41 tend to raise up a ridge or mass of soil at the same time that the beet is lifted, the upper point members 16, operating closely adjacent the surface of the ground, act to hold this upwardly urged mass of soil down while, at the same time, acting upon the beet to impart an upward movement thereto additional to that initially imparted by the lower points or blades 44. In this way, a tendency to form clods in hard ground and to break up the ground into pieces about the same size as the beets themselves is practically entirely eliminated. The arrangement of the beet engaging and lifting members, their support from the frame 1 and the beet-receiving conveyor 28, are common in the several forms of this invention, and hence the same reference numerals have been employed for identical parts in the several forms of this invention.

According to the form of the invention shown in Figure 1, a pair of auxiliary beet engaging and lifting units are carried by the frame 1 in a position thereon to receive the beets that are loosened and at least partially raised by the upper and lower pairs of lifter members described above. Since each of the two auxiliary lifting units shown in Figure 1 is substantially identical with the other, except for certain parts that may be right- or left-hand, respectively, a detailed description of one of these units will suffice. Referring now to Figure 1 in which the left-hand auxiliary beet-engaging and lifting unit is indicated by the reference numeral 50, the latter comprises a rotatable member or kicker wheel 51 comprising a plurality of bars 52 in the form of angle members secured, as by welding, at their forward ends to a disk 53 or similar member which is secured, as by welding, to the forward portion of a shaft 54 which extends generally longitudinally and at its forward end is supported for rotation in a journal 55 carried at the lower end of a bar 56 which is connected at its upper end to a journal member 57. The rear portion of the shaft 54 has a rear disk member 59, secured thereto by welding or the like, and the rear end of the shaft 54 is carried in a journal 61 that is secured to the rear end of a longitudinal bar 62, the forward end 62a of which is welded to the lower end of the bar 56 and also to the lower end of a bar 63 which extends upwardly, generally parallel to the bar 56 and at its upper end is connected to a journal member 65 rearwardly of the forward journal member 57. The rear ends of the bars 52 are secured to the rear disk 59, and since the latter disk is smaller than the forward disk 53, the bars 52 and associated parts thus form a rearwardly tapered kicker wheel member which is in the form of a frustoconical part of somewhat open construction, permitting fragments of soil and the like to drop therethrough. The upper journals 57 and 65, connected to the upper ends of the bars 56 and 63, are mounted on an upper shaft 67 which is supported for rotation in a pair of journal members 68 and 69, each of which is provided with an extension 69a which is secured to a depending portion of a yoke member 71. The yoke 71 is secured to the lower end of a vertical shaft section 73 that is mounted for oscillatory movement about a generally vertical axis in a vertically extending frame structure 74. The latter includes a pair of vertical bars 76 secured, as at 77, to the frame 1 and to a pair of crossbars 78 and 79 which are secured in any suitable way to the vertical bars 76, the transverse bars 78 and 79 being apertured, as at 80, to receive the vertical shaft sections 73. Each of the latter carries a collar 81 at its upper end whereby each of the yokes 71 and associated parts are supported for operation on the harvester frame 2.

The forward end of each of the shafts 67 is connected by means of a universal joint 83 to a driving shaft section 84, which preferably but not necessarily is in the form of a pair of telescopic shafts extending forwardly to a point of connection with a suitable source of operating power. A sprocket 85 is fixed to the forward end of each of the shafts 67 and receives a sprocket chain 86 which at its lower end is trained over a lower sprocket member 87 that is fixed to the lower or kicker wheel shaft 54, whereby rotation of the driving shafts 84 serves to drive the kicker wheels 51. The shafts 54 form means for supporting the kicker wheels or rotatable members 51 for rotation in the swingably mounted members 56, 62 and 63, said members forming a generally laterally swingable subframe. The frame structure 74 is reenforced by a pair of braces 89 which may be secured, as by bolts 90, to the frame bars 76 and the main frame bars 2. A bracket 92 is fixed to the lower crossbar 79 and at its rear end receives a bracket 93 which is welded to a curved shield member 94 that is disposed in an upwardly and rearwardly extending position generally over the kicker wheels 51 and, at its forward end, fairly closely adjacent to, or between, the forward ends of the kicker wheels 51. Being curved in a longitudinal vertical plane, any beets or other crop thrown upwardly against the curved shield 94 will be directed rearwardly into the conveyor 28.

The operation of the harvester as described above is substantially as follows.

The harvester is driven down a row of beets or other crop at such depth of operation that the lower puller points or lifting members 41 operate well under the ground surface so as to act on the lower portions of the beets while the upper puller points or lifting members 16 act on the upper portions of the beets. The lower lifting members 41 are disposed somewhat closer together than the upper lifting members but extend rearwardly and upwardly at a somewhat greater angle, as shown in Figure 2, while the upper members 16 are disposed somewhat in a more nearly horizontal position and slightly farther apart but also slightly in advance of the lower lifters 41. These relations have proven to be such that the upper and lower pairs of lifting members act upon the same beet at about the same time while the major portion of the soil that is, mainly, loosened by the lower lifter members 41, passes rearwardly over the lower points but is held down by the upper members which operate closely adjacent the ground surface. However, due to the shape of the upper lifter members, particularly their upper and laterally inwardly facing forward fixed portions and the rearward convergence thereof, the beets or other crop initially loosened and at least partially lifted by the lower lifter members are raised an additional amount by the upper lifter members while the latter function, as aforesaid, to hold down the greater proportion of the soil so as to prevent the latter being thrown upwardly or broken up into portions about the size of beets. The rear rotatable sections 20 of the upper lifter members are driven by the rotation of the shafts 24, the latter being driven from any suitable source of power, and, the rear rotatable sections 20 being rotated in the direction of the arrows shown in Figure 3, it will be seen that as the harvester progresses forwardly and each beet raised by the rearwardly converging lifter members, the rotation of the rear rotatable sections 20 will act to impart additional lifting action to the beets, whether they are the small beets that are engaged by the rear portions of the rotatable parts 20 or the more forward portions thereof which engage the larger beets. Also, during the progress of the machine, the smaller or tail portions of the beets, even of the larger beets, will be engaged by the rotatable members 20 so that each beet is raised in a positive upwardly directed motion sufficient to project them well above the adjacent fragments of the soil in the row.

Figure 4:
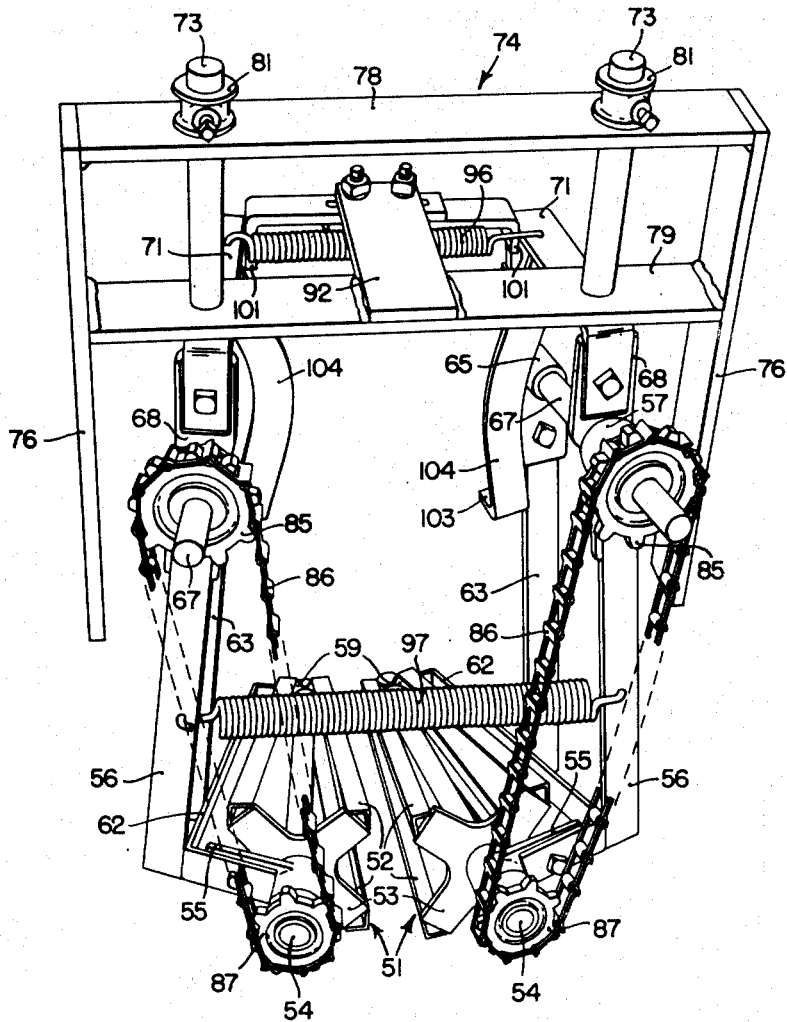
Figure 4 is a fragmentary perspective view showing a portion of the oscillatable mounting supports for the rotatable auxiliary lifting elements.

The beets that are rojected upwardly by the rotating sections 20, or, in the case of the larger beets, possibly by the forwardmost sections 17, are engaged by the rotatable kicker wheels 51 whereby a further raising or lifting action is imparted to the beets. As best shown in Figures 1 and 4, the shafts 54 are disposed in a rearwardly and slightly downwardly converging relation. This places the lower bars 52 in approximately a horizontal position. The bars 52 are spaced apart on the disks 53 and 59 a distance sufficient to accommodate the largest beets. Furthermore, and as shown in Figure 4, the kicker wheels 51 are operated in timed relation so that the bars 52 on one kicker wheel successively come into engagement or registration with the corresponding bars on the other kicker wheel. The larger end of each of the kicker wheels 61 is disposed forwardly so that, the forward portions of the bars 52 have a somewhat greater peripheral velocity than the rear portions, the portions having the greater peripheral velocity being those portions which come into engagement with the larger beets, the smaller beets being engaged principally by the more rearward portions of the bars 52. Elevating the larger beets at a somewhat greater velocity than the smaller beets insures that at least the major portion of even the larger beets will be lifted out of connection with the ground before the forward travel of the machine creates any tendency to push the larger beets over forwardly. Disposing the kicker wheels 51 in a rearward and downward position brings the areas of contact between the rear portions of the bars 52 and the smaller beets somewhat closer to the ground surface, and hence facilitates engagement of even the smaller beets by the kicker wheels 51. The latter members, being of cagelike or open construction, cooperate with the upper pairs of lifter members 16 to break up any clods or soil fragments that might otherwise tend to pass into the machine.

The two kicker wheels 51 are mounted for oscillation about vertical axes and for laterally inward and outward swinging, by the supporting means for the yokes 71 described above. In order to insure operating contact between the kicker wheels 61 and the beets, whether they are large or small, a spring 96 is connected to the portions of the yokes 71 rearwardly of their vertical axes 73. The spring 96 thus tends to cause the rear portions of the kicker wheels to move toward one another, thereby preserving the forwardly diverging relation of these members. Further, and in order to insure swinging the kicker wheel supporting structures, comprising the bars 56, 62 and 63, toward one another, a spring 97 is connected between the forward bars 56, as best shown in Figure 4, the spring thus tending to keep the kicker wheels 51 in positions as close together as the beet or beets therebetween will permit. It is to be noted that by virtue of this construction, the kicker wheels 51 will engage firmly and positively two beets that may simultaneously be engaged therebetween, and this is true whether the beets are of the same size or of different sizes and whether the rear beet or the forward beet is larger. Secured to the bracket 92 is a pair of stops 101 against which the spring 96 tends to hold the rear portions of the yokes 71, and stops 103 are formed at the lower ends of depending members 104 that are carried by the yokes 71 to cooperate with the rear bars 63 to limit the laterally inward swinging movement of the kicker wheels 51. These latter stops are omitted from Figure 1 in the interest of clarity but are shown in Figure 4.

Figure 5:
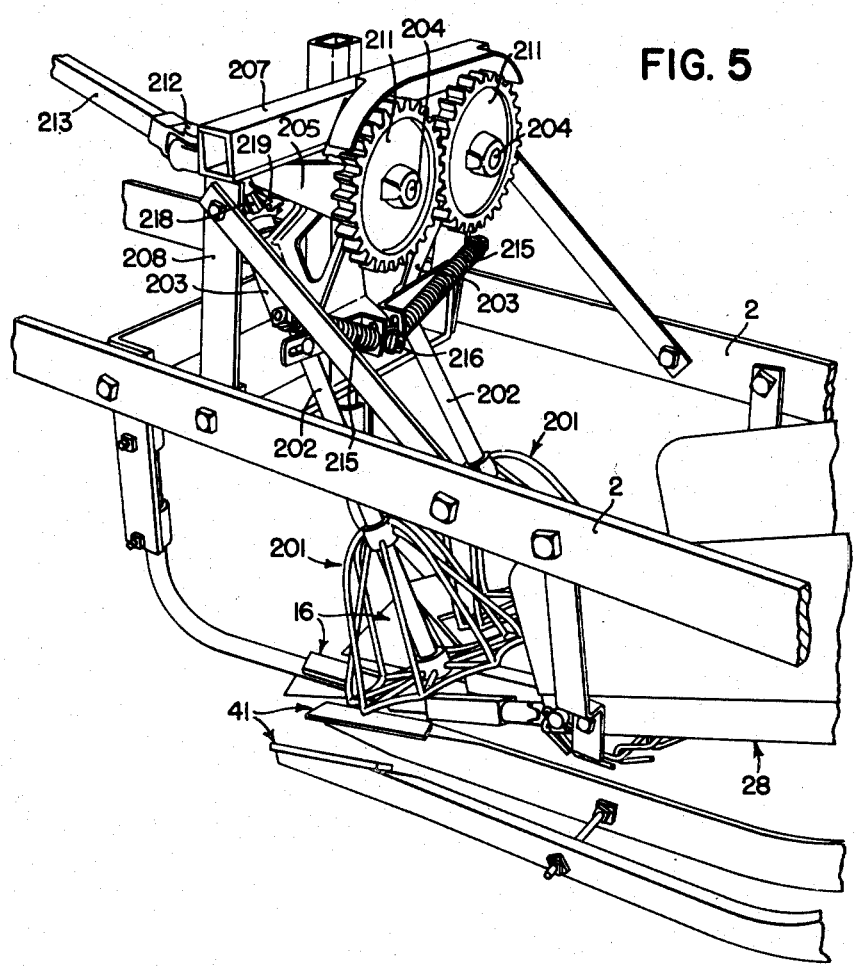
Figure 5 is a perspective view showing a modified form of lifting mechanism.

In Figure 5 a somewhat different form of auxiliary beet lifting unit is shown. This form of the invention includes substantially the same construction, so far as the frame and the upper and lower pairs of lifting members are concerned, but the horizontally disposed kicker wheels 51 shown in Figures 1-4 are, in effect, replaced by a pair of kicker wheels 201 which are mounted for rotation substantially about generally vertically extending axes. Referring now to Figure 5, each of the kicker wheels 201 comprises a cage-like structure fixed to the lower end of a generally vertically arranged shaft 202. The upper end of each of the shafts 202 is mounted for rotation in a laterally swingable bracket member 203, and the upper portion of each bracket member 203 is mounted for lateral swinging on a shaft 204, the shafts 204 being carried by suitable journals 205 fixed to a cross-bar 207 which is supported on the frame bars 2 by vertical members 208. The rear ends of the shafts 204 carry meshing gears 211 and the forward end of one of the shafts 204 is connected by a universal joint 212 to a drive shaft 213 that is connected by any suitable means to a source of power. The laterally swingable shaft-carrying bracket members 203 are held against outward swinging by yielding spring means 215, which includes a pair of springs connected at their outer ends to the brackets 203 and at their inner ends to a stud 216 that is carried in any suitable manner on the frame of the harvester. The upper end of each of the shafts 202 carries a bevel gear 218 which meshes with a companion bevel gear 219 on the associated horizontal shaft 204. Thus, the kicker wheel shafts 202 are rotated by the shafts 204. Beets or other crop loosened from the ground and raised at least partially by the upper and lower pairs of lifting members 16 and 41 are engaged by the rotatable kicker wheels 201 and projected generally upwardly and rearwardly to the conveyor 28.

Figure 6:
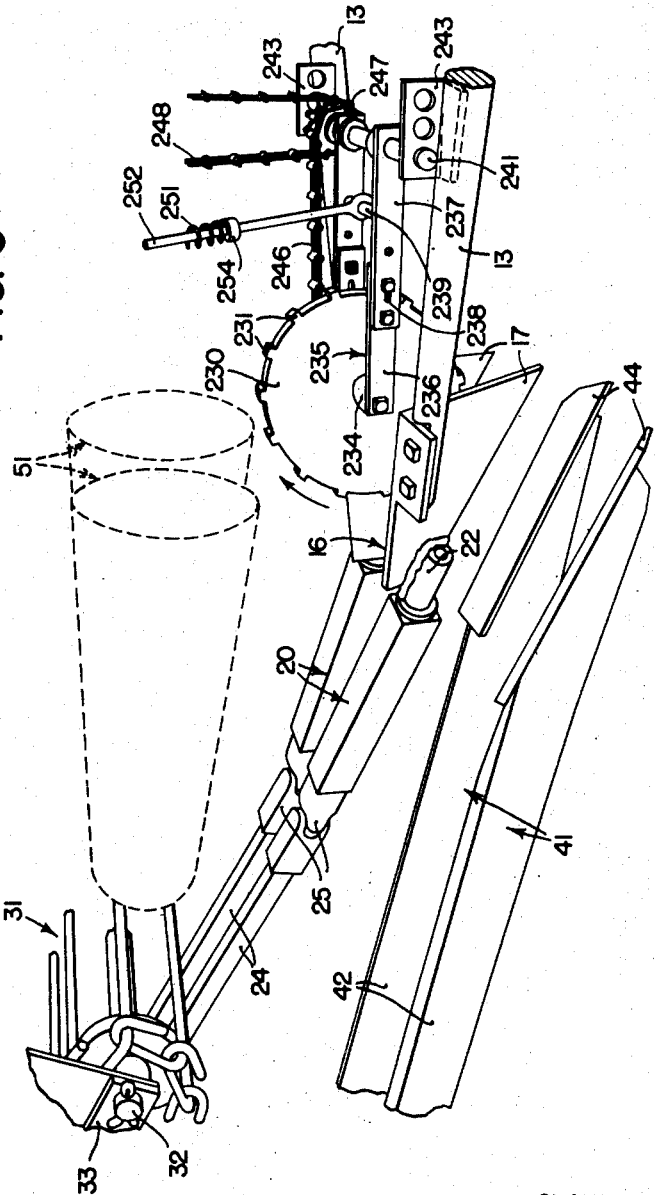
Figure 6 is an enlarged fragmentary perspective view, similar to Figure 2, showing a modified form of the present invention in which means is provided for preventing the beets from being overturned forwardly during the progress of the machine along a row of beets.

Figure 6 shows a further modified form of the present invention which prevents beets or other crop from being overturned. Under some conditions there may be an appreciable tendency for the beets or crop to be pushed over forwardly by the lifting members or points, and in order to provide means to hold the beets substantially upright we provide a rotatable wheel 230 having lugs 231 or other suitable means thereon facilitating the action of the wheel on the beets. The wheel 230 is rotated in the direction of the arrow shown in Figure 7. The wheel 230 is mounted on a shaft 234 which is journaled for rotation in a frame 235 preferably consisting of two pairs of straps 236 and 237 adjustably connected together, as by bolt and slot means 238. The strap sections 237 are connected rigidly together by a cross member 239 welded thereto. The forward portions of the straps 237 are apertured and mounted on a cross shaft 241 supported in a selected pair of openings formed in a pair of lugs 243 that are secured, as by welding, to the horizontal portions of the standards 11, it being understood that the wheel 230 and associated parts are, in Figure 6, shown as embodied in the harvester illustrated in Figure 2, and hence the harvester parts are indicated in Figure 6 by the same numerals employed in Figure 2 for the same parts. A sprocket (not shown) is mounted on the shaft 234 and is fixed to the wheel 230 in any suitable way, as by being fixed to the shaft 234 to which the wheel 230 is fixed. The sprocket just mentioned receives a driving chain 246 which at its forward end is trained over a double sprocket member 247 which also receives a driving chain 248 connected in any suitable way with the motor or other means which drives the other harvester mechanism.

The wheel 230 may be disposed in different positions fore and aft either by suitably adjusting the rear straps 236 relative to the forward straps 237, or by positioning the shaft 241 in different sets of openings in the lugs 243, or both, as desired. Normally, the wheel is urged downwardly by resilient means which may take the form of a pressure spring 251 disposed about a pressure rod 252 that extends downwardly and carries a collar 254 which receives the lower end of the spring 251. The lower end of the rod 252 is pivoted to the frame 235 in any suitable way, as by being connected to the cross member 239.

In operation, this form of the invention provides means to prevent the beets from being overturned forwardly. The wheel 230 is driven in the direction of the arrow and acts upon the beets, particularly the larger beets, to maintain the beets upright as the forward points 16 raise the beets from the mass of soil passing between the upper and lower points or lifting members through the space *s*. By virtue of the spring connection 251 and associated parts, the wheel 230 may rise and fall, as necessary, to permit the wheel to pass over the beets, especially the larger ones. The auxiliary lifting members 51 are spaced apart a distance sufficient to receive the wheel 230, which is relatively narrow, therebetween.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a harvester for beets or the like, a mobile frame, a pair of laterally spaced apart members, vertical pivot means operatively connecting said members to said frame, spring means interconnecting said spaced apart members generally rearwardly of said pivot means, a pair of generally horizontally disposed rotary crop-engaging means on said members, and driving means connected to said pair of rotary crop-engaging means.

2. The invention set forth in claim 1, further characterized by means connecting said rotary crop-engaging means for swinging movement relative to the associated members about generally fore-and-aft extending, generally horizontal axes.

3. The invention set forth in claim 1, further characterized by a yoke swingably connected with each of said members for movement relative thereto about a generally horizontal axis, and means supporting the rotary crop-engaging means on said yokes.

4. In a harvester for beets or the like, a mobile frame, a pair of laterally spaced apart members, vertical pivot means operatively connecting said members to said frame, spring means interconnecting said spaced apart members at points spaced away from said pivot means, a pair of generally horizontally disposed rotary crop-engaging means on said members, and driving means connected to said pair of rotary crop-engaging means.

5. In a harvester for beets or the like, a mobile frame, a pair of laterally spaced apart members, vertical pivot means operatively connecting said members to said frame, spring means interconnecting said spaced apart members at points spaced away from the axes of said pivot means, and a pair of generally horizontally disposed, generally fore-and-aft extending crop-engaging means on said members.

6. The invention set forth in claim 5, further characterized by means pivotally connecting each of said crop-engaging means with the associated member for movement relative to the latter about a generally horizontal axis.

7. In a harvester for beets and the like, a mobile support, lifting means carried by said mobile support in a position to loosen the soil and at least partially raise the beets or other crop, movable beet-engaging members carried by said support generally directly above said lifting means and above the ground surface, driving means connected to said members to move them in a direction to impart a substantially vertically directed movement to said beets or other crop, and a shield carried by said support in a position lying in the path of the beets or other crop raised by said engaging means and curved in a generally fore-and-aft direction for directing the beets or other crop in a generally longitudinal direction.

8. In a harvester for beets or the like, a mobile frame, a pair of laterally spaced apart members, vertical pivot means operatively connecting said members to said frame, a pair of generally horizontally disposed crop-engaging means, a pair of laterally swingable subframes connected, respectively, with said pivoted members for movement relative thereto about generally horizontal axes, and means supporting said pair of crop-engaging means on said laterally swingable subframes.

CLAUDE W. WALZ.
HOWARD F. CLAUSEN.

References Cited in the file of this patent

UNITED STATES PATENTS

| Number | Name | Date |
|---|---|---|
| 1,211,030 | Addleman | Jan. 2, 1917 |
| 1,269,789 | Courtney | June 18, 1918 |
| 2,334,945 | Mitchell et al. | Nov. 23, 1943 |
| 2,385,895 | Tramontini | Oct. 2, 1945 |
| 2,528,806 | Walz et al. | Nov. 7, 1950 |